United States Patent [19]
Corrigan et al.

[11] Patent Number: 5,179,662
[45] Date of Patent: Jan. 12, 1993

[54] OPTIMIZED I/O BUFFERS HAVING THE ABILITY TO INCREASE OR DECREASE IN SIZE TO MEET SYSTEM REQUIREMENTS

[75] Inventors: Michael J. Corrigan; Gary R. Ricard; Richard M. Rocheleau; Larry W. Youngren, all of Rochester, Minn.

[73] Assignee: International Business Machines Corporation, Armonk, N.Y.

[21] Appl. No.: 401,335

[22] Filed: Aug. 31, 1989

[51] Int. Cl.⁵ .......................... G06F 13/00; G11C 7/00

[52] U.S. Cl. .................... 395/250; 364/238.6; 364/239; 364/239.6; 364/244.3; 364/254.5; 364/DIG. 1; 365/189.05

[58] Field of Search ............ 364/DIG. 1, DIG. 2, 364/200 MS File, 900 MS File; 395/250; 365/189.05, 189.07, 221

[56] References Cited

U.S. PATENT DOCUMENTS

| | | | |
|---|---|---|---|
| 3,675,216 | 7/1972 | James | 364/200 |
| 4,288,860 | 9/1981 | Trost | 364/900 |
| 4,298,954 | 11/1981 | Bigelow et al. | 364/900 |
| 4,378,588 | 3/1983 | Katzman et al. | 364/200 |
| 4,422,145 | 12/1983 | Sacco et al. | 364/300 |
| 4,442,485 | 4/1984 | Ota et al. | 364/200 |
| 4,507,751 | 3/1985 | Gawlick et al. | 364/900 |
| 4,509,119 | 4/1985 | Gumaer et al. | 364/200 |
| 4,597,044 | 6/1986 | Circello | 364/200 |
| 4,780,815 | 10/1988 | Shiota | 364/200 |
| 4,819,156 | 4/1989 | DeLorme et al. | 364/200 |
| 4,843,544 | 6/1989 | Dulac et al. | 364/200 |
| 4,860,244 | 8/1989 | Bruckert et al. | 364/900 |
| 4,918,527 | 4/1990 | Penard et al. | 358/160 |
| 5,038,277 | 8/1991 | Altman et al. | 395/250 |

FOREIGN PATENT DOCUMENTS 0141753 7/1983 European Pat. Off. .

OTHER PUBLICATIONS

R. A. Skov and E. G. Newman, "Buffer System", IBM T.D.B., vol. 2, No. 5, Feb. 1960, pp. 86-89.

Articled entitled, "Dynamic Initial Allocation and Local Reallocation Procedures for Multiple Stacks", by D. Yun Yeh and Toshinori Munakata, Communications of the ACM 29 (1986) Feb., No. 2, New York, N.Y., USA.

Dynamic Compression During System Save Operations—IBM Technical Disclosure Bulletin, vol. 26, No. 11, Apr. 1984, pp. 5970-5974.

Dynamically Paged Control Store Buffer Management—IBM Technical Disclosure Bulletin, vol. 14, No. 12, May 1972, pp. 3857-3859.

Swinging Buffer with Programmable Size—IBM Technical Disclosure Bulletin, vol. 30, No. 4, Sep. 1987, pp. 1432-1434.

Improved Buffering for Printer Device Driver—IBM Technical Disclosure Bulletin, vol. 28, No. 11, Apr. 1986, p. 5068.

Primary Examiner—Michael R. Fleming
Assistant Examiner—Gopal C. Ray
Attorney, Agent, or Firm—Curtis G. Rose; Steven W. Roth

[57] ABSTRACT

Optimization I/O buffers are used to write data into or read data from auxiliary storage using a double buffering scheme. When a user wants to send data to auxiliary storage, the first buffer is filled with data and the contents are asynchronously written to auxiliary storage. Without waiting for the asynchronous write to complete, the second buffer is filled with data. When the second buffer is filled, the contents of the second buffer are asynchronously written to auxiliary storage. If the first buffer has not completed its write operation by this point, the buffers are determined to be too small and the size of both buffers is increased. Control switches back and forth between these two buffers until all of the desired data is sent to auxiliary storage. The size of the buffers is increased until the computer system does not have to synchronously wait for one buffer to complete its write operation before it can refill that buffer with new data. Ideally, the first buffer should complete its write operation when the second buffer is filled beyond a predetermined threshold percentage, such as one half. If the first buffer completes its write operation before the second buffer is filled beyond the predetermined threshold percentage, the buffers are determined to be too large and the size of both buffers are decreased. The size of the buffers is dynamically increased and decreased as needed to achieve an optimum size based on the unique and dynamically changing computer environment.

7 Claims, 10 Drawing Sheets

OPTIMIZED I/O BUFFERS HAVING THE ABILITY TO INCREASE OR DECREASE IN SIZE TO MEET SYSTEM REQUIREMENTS

FIELD OF THE INVENTION

This invention relates to the data processing field. More particularly, this invention describes a method and apparatus for optimizing the size of I/O buffers.

BACKGROUND OF THE INVENTION

Computer users today desire optimum performance from their computer system. Where before it may have been acceptable to wait long periods of time for data operations between the user and the computer system to complete, users today will not tolerate noticeably poor performance. The goal of computer designers is to make computer systems appear to the user to be quick and responsive instead of slow and underpowered.

A special challenge to computer designers is to minimize the apparent time it takes to read and write data to and from auxiliary storage. Auxiliary storage, such as magnetic or optical disk, is notoriously slow. Reading and writing data to and from auxiliary storage is especially problematic in database and image applications, where large amounts of data need to be inserted into and retrieved from a database located on auxiliary storage. Computer users running database applications desire quick access to the data in the database and do not want to wait a long period of time to gain this access. It is desirable to perform as much work as possible in parallel with I/O operations to and from auxiliary storage This allows the user to perform other tasks instead of waiting for the I/O operation to complete.

Most computer systems today use buffers to page data into and out of auxiliary storage. The buffers are located in a faster memory area, such as main storage. Some computer systems use a double buffering scheme. When a user wants to send data to auxiliary storage, the first buffer is filled with data and its contents are asynchronously written to auxiliary storage. Without waiting for the asynchronous write to complete the second buffer is filled with data. When the second buffer is filled, the contents of the second buffer are asynchronously written to auxiliary storage. Assuming the first buffer has completed its write operation, the first buffer is filled with new data and another asynchronous write operation is performed. Control switches back and forth between these two buffers until all of the desired data is sent to auxiliary storage.

While this double buffering scheme does improve performance for a steady state environment, it does not optimize performance for each unique and dynamically changing computer environment. In addition, poor choice of the size of these buffers may adversely impact the performance of the computer system. If the buffers are too small, the first buffer will not complete its write operation before the second buffer is full In this case, the computer system must waste time synchronously waiting for the first write operation to complete before the first buffer can be filled with new data. Synchronous waits are undesirable since they increase the overall elapsed time of batch jobs and increase the response time of interactive jobs. This can be very visible and annoying to the user. Synchronous waits can be minimized or even eliminated if the buffers are made bigger. But if the buffers are too big, time is wasted filling buffers, and data is not written to or read from auxiliary storage as fast as it could be. In addition, valuable memory in main storage that could be used more effectively by other processing is tied up and wasted if the buffers are too big.

The goal is to make the buffers not too small or too big, but just right. If computer designers attempt to preset the size of the buffers, they cannot take into account each user's unique and dynamic computer environment. The buffers may be the right size for some of the users some of the time, but will not be the right size for all of the users all of the time.

SUMMARY OF THE INVENTION

It is a principle object of the invention to improve the performance of a computer system.

It is another object of the invention to improve the performance of sending data to and from auxiliary storage of a computer system.

It is another object of the invention to optimize the performance of inserting and retrieving data to and from a database located on auxiliary storage of a computer system.

It is another object to dynamically change the size of I/O buffers based on the specific computing environment.

These and other objects are accomplished by the optimized I/O buffers disclosed herein.

A computer system having optimized I/O buffers is disclosed. The I/O buffers are used to write data into or read data from auxiliary storage. A double buffering scheme is used. When a user wants to send data to auxiliary storage,. the first buffer is filled with data and the contents are asynchronously written to auxiliary storage. Without waiting for the asynchronous write to complete, the second buffer is filled with data. When the second buffer is filled, the contents of the second buffer are asynchronously written to auxiliary storage. If the first buffer has not completed its write operation by this point the buffers are determined to be too small and the size of both buffers is increased. Control switches back and forth between these two buffers until all of the desired data is sent to auxiliary storage. The size of the buffers is increased until the computer system does not have to synchronously wait for one buffer to complete its write operation before it can refill that buffer with new data. Ideally, the first buffer should complete its write operation when the second buffer is filled beyond a predetermined threshold percentage, such as one half. If the first buffer completes its write operation before the second buffer is filled beyond the predetermined threshold percentage, the buffers are determined to be too large and the size of both buffers are decreased. The size of the buffers is dynamically increased and decreased as needed to achieve an optimum size based on the unique and dynamically changing computer environment.

DESCRIPTION OF THE PREFERRED EMBODIMENT

Figure 1:
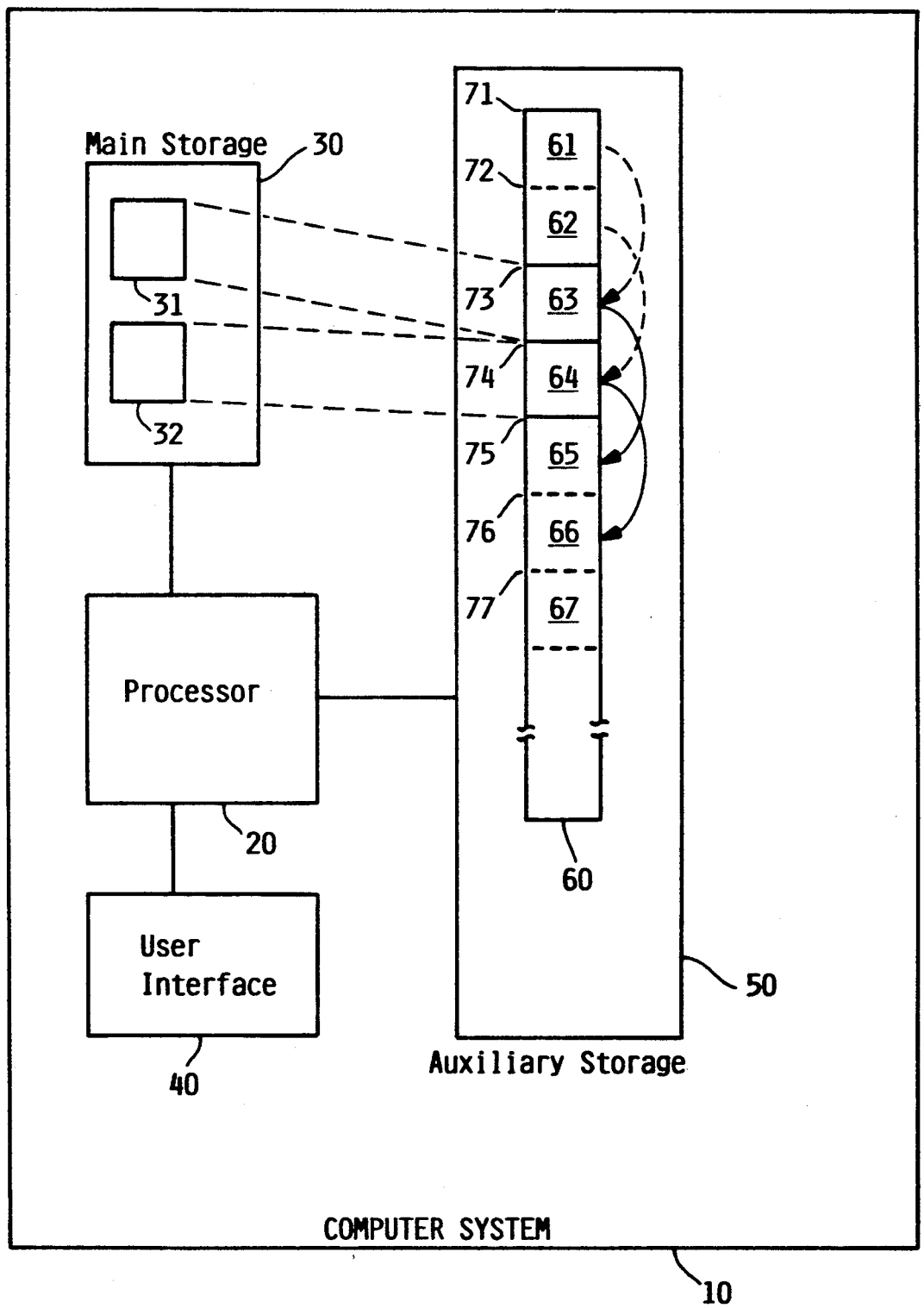
FIG. 1 shows an overall block diagram of the computer system of the invention.
Figure 2A:
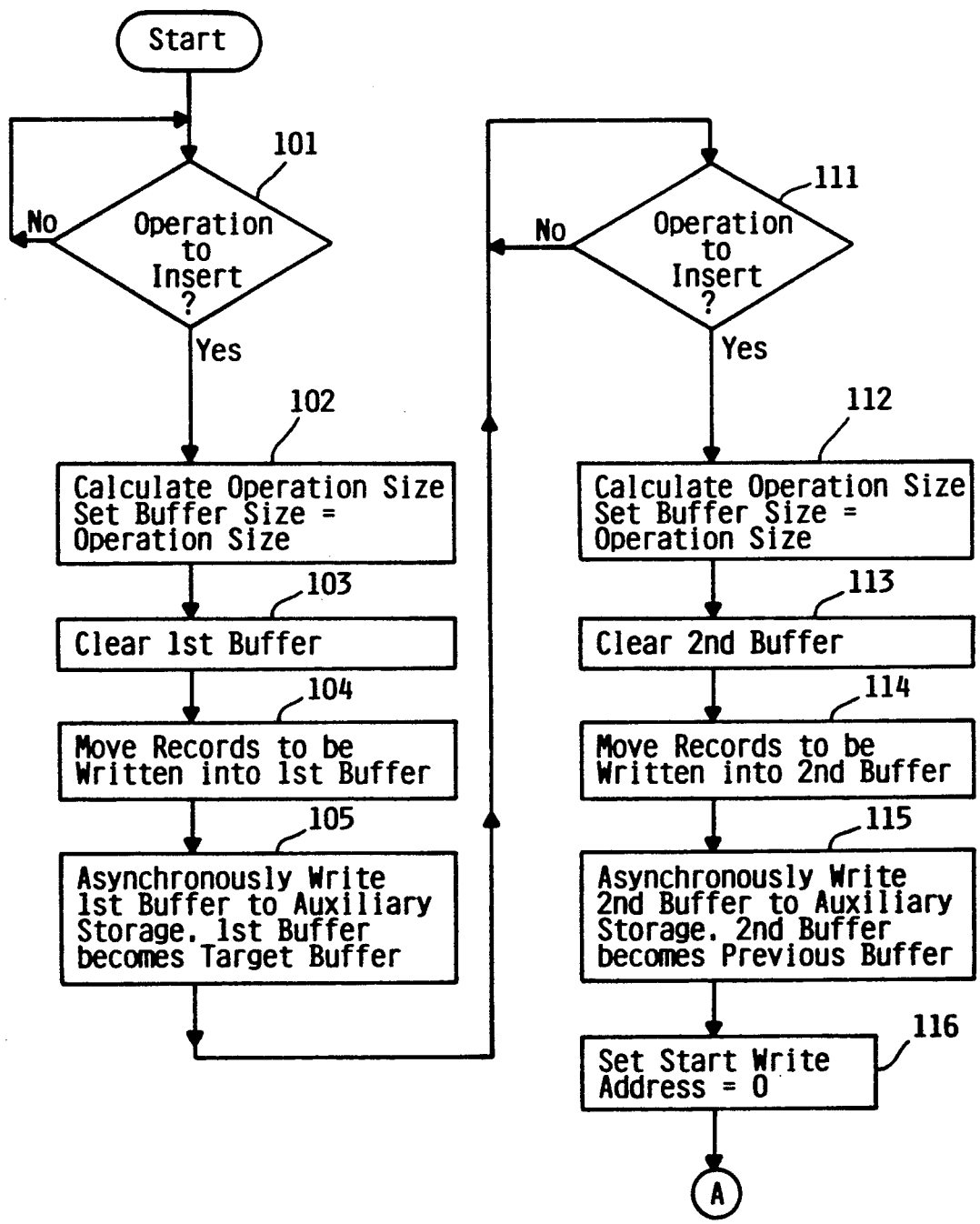
FIGS. 2A-2E shows a flowchart of the insert operation of the invention.
Figure 2B:
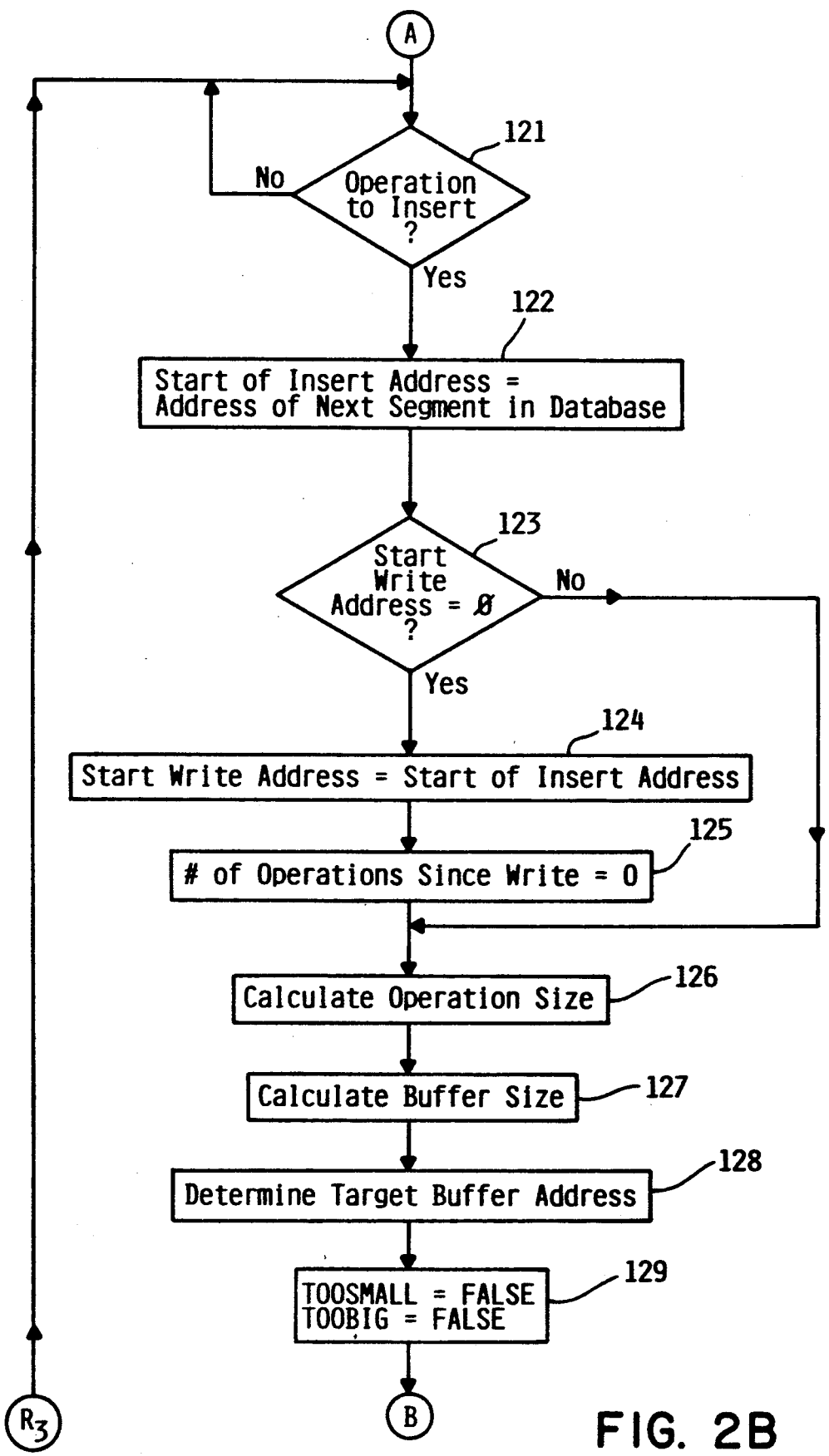
Figure 2C:
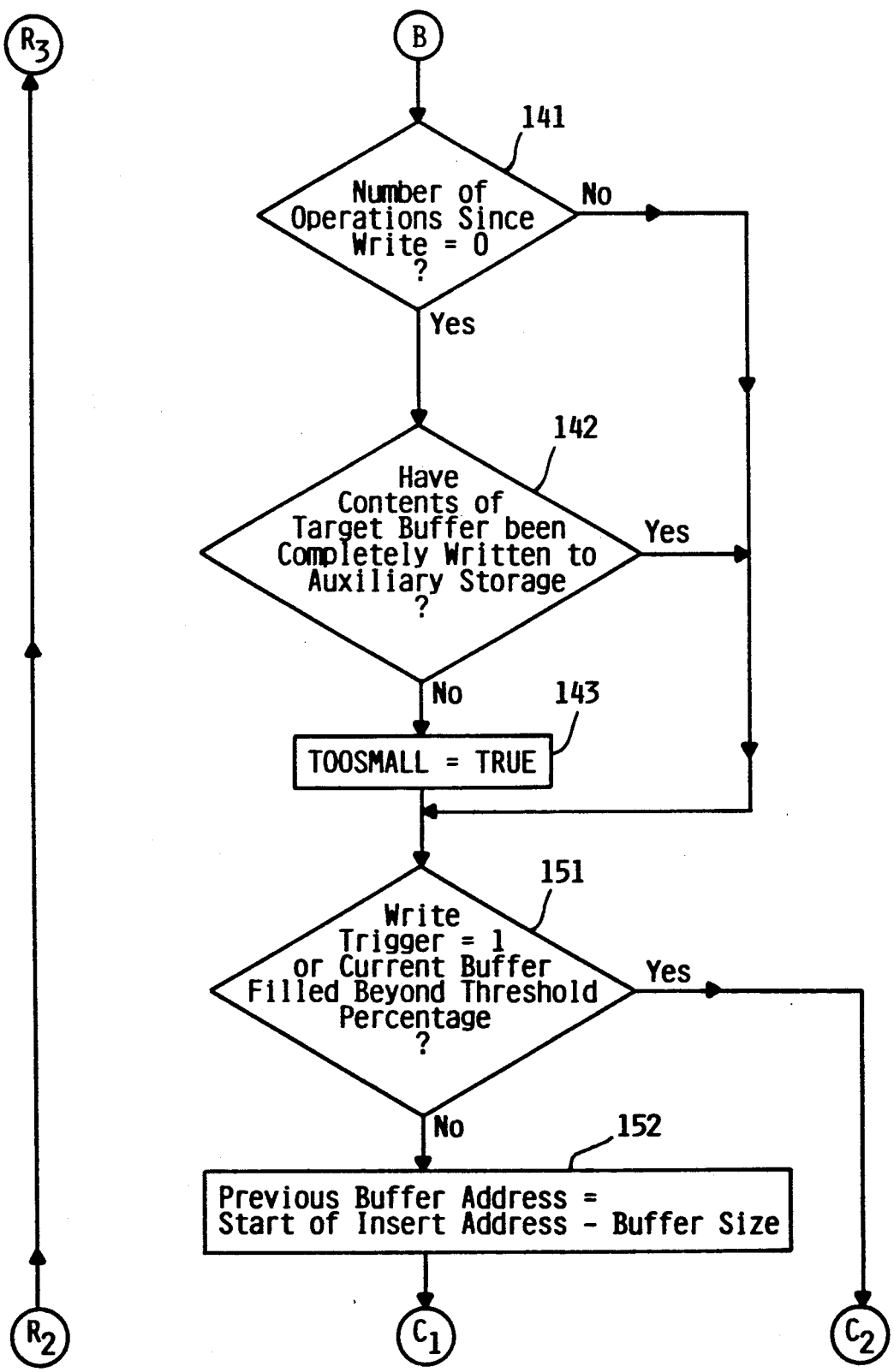
Figure 2D:
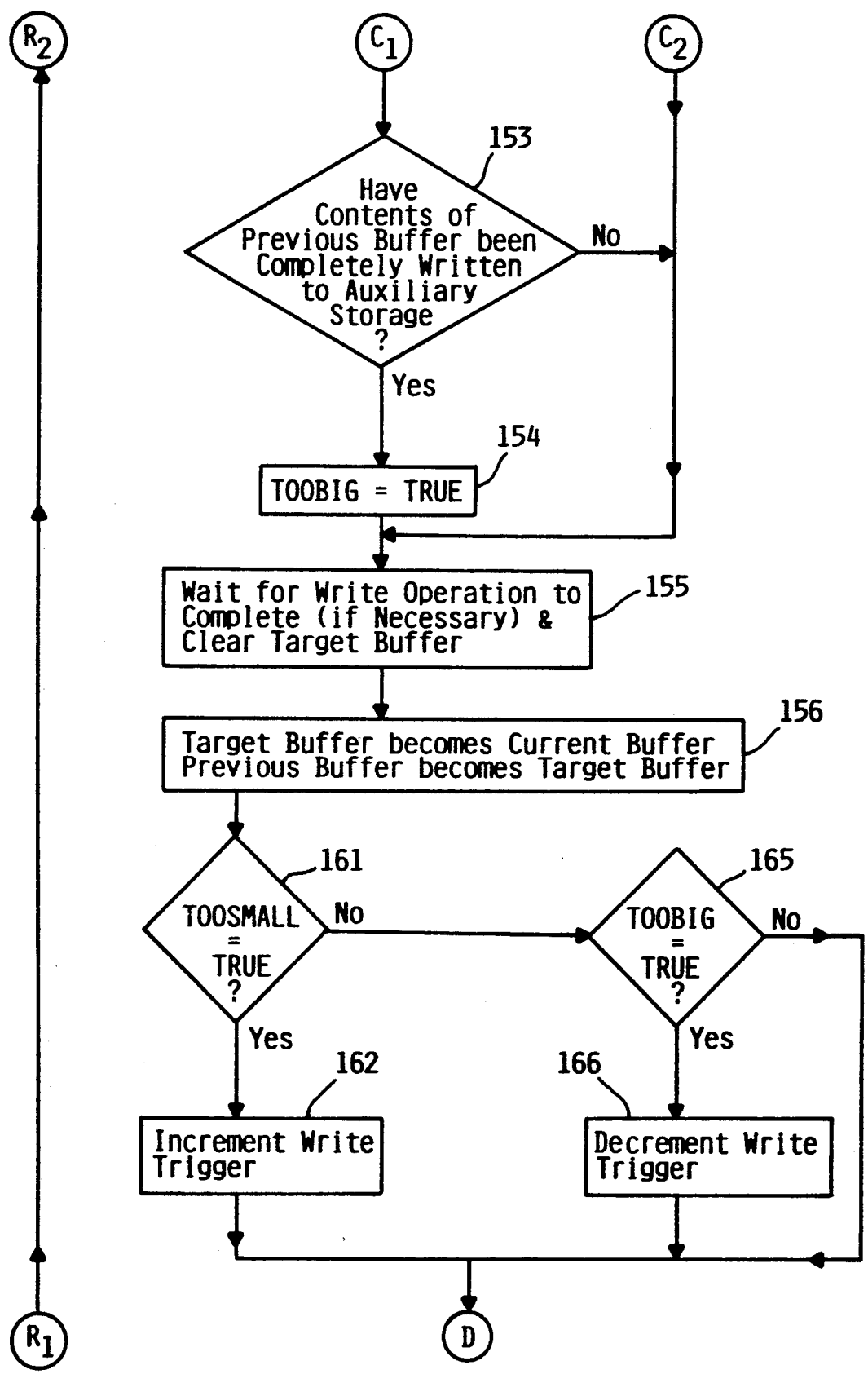
Figure 2E:
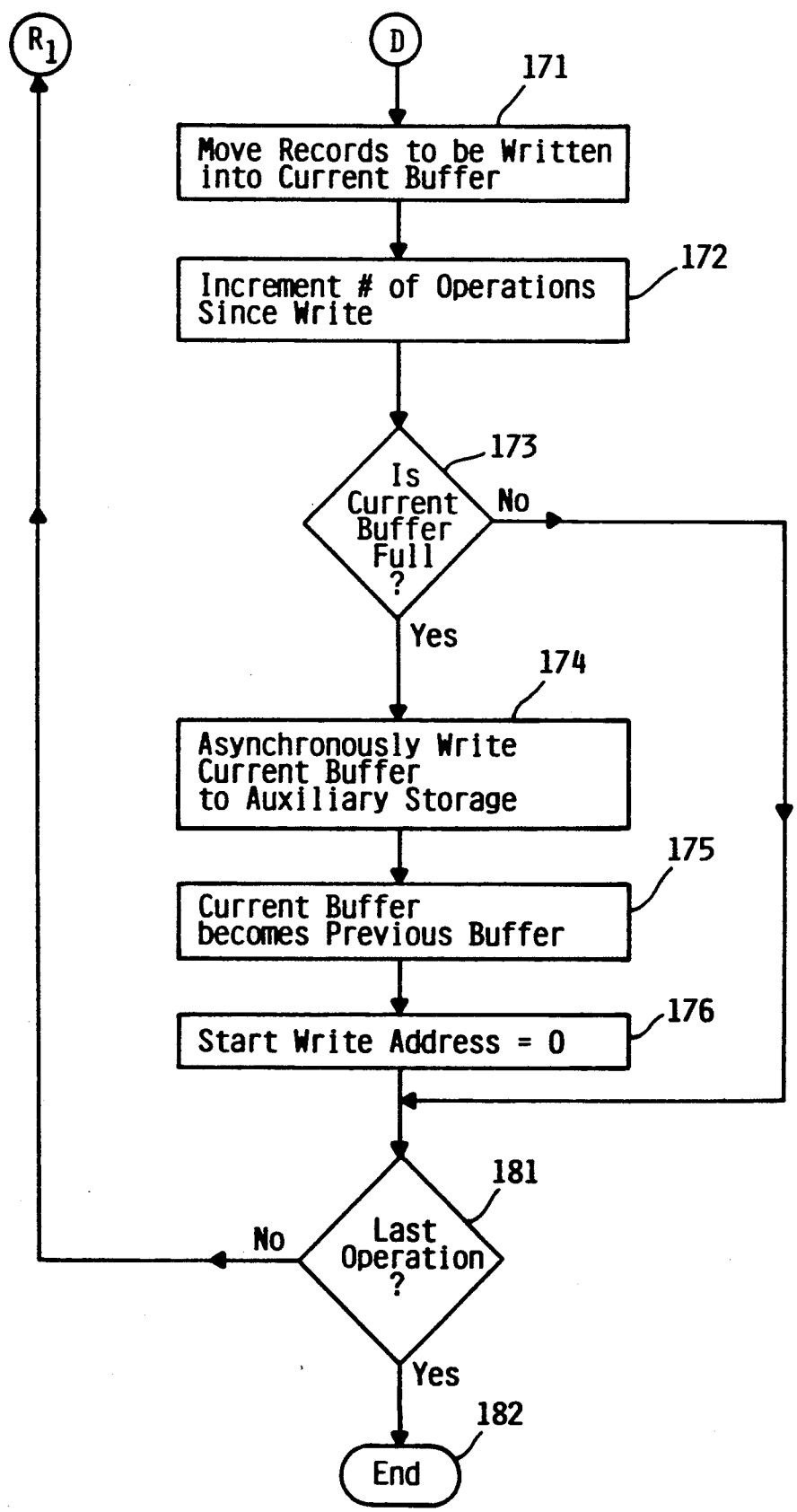

FIG. 1 shows an overall block diagram of the computer system of the invention. In the preferred embodiment, computer 10 is an IBM Application System/400 Midrange Computer, although computer 10 could be a personal computer, a mainframe computer or any other type of computer and still fall within the scope of the invention. Computer 10 has processor 20, suitably programmed as indicated in the flowcharts of FIGS. 2 and 3, as will be explained later. Connected to processor 20 is main storage 30, and auxiliary storage 50. The user communicates to computer 10 through user interface 40, which is also connected to processor 20. Main storage 30 is typically random access memory (RAM) or other memory available to processor 20 for its use. Auxiliary storage 50 is typically a magnetic or optical disk or other direct access storage device. User interface 40 can be a personal computer or any other workstation that allows the user to communicate to computer 10.

Main storage 30 has I/O buffers 31 and 32 which can dynamically vary in size. Auxiliary storage 50 has database 60. Database 60 is divided up into segments 61 through 67. When the user wants to insert data into database 60, buffer 31 is filled with data and the contents are asynchronously written to database 60 into segment 61. Without waiting for the asynchronous write to complete, buffer 32 is filled with data. When buffer 32 is filled, the contents of the buffer 32 are asynchronously written to database 60 into segment 62. If buffer 31 has completed its write operation by this point, buffer 31 is filled with new data and the contents are asynchronously written to database 60 into segment 63. Control switches back and forth between buffers 31 and 32 and they "leapfrog" past each other to sequentially write segments 61-67 of database 60.

The flowchart of FIGS. 2A-2E showing how processor 20 optimizes the size of buffers 31 and 32 during a database insert operation will now be discussed. Block 101 checks to see if there is an operation to insert. An operation is defined in the preferred embodiment as a group of one or more data records. Block 101 waits until there is an operation to insert, and control moves to block 102 when one is received. If all records are the same length block 102 calculates the Operation Size by multiplying the number of records by the length of a record. This technique is easily adaptable to variable length records. It also sets the size of buffers 31 and 32 (FIG. 1) to be equal to the Operation Size. Block 103 clears buffer 31, and block 104 moves the records to be written into buffer 31. Block 105 asynchronously writes the buffer 31 to segment 61 of database 60. Buffer 31 is now referred to as the "Target Buffer". The purpose of the Target Buffer will be explained later.

Without waiting for the above write operation to complete, block 111 checks for another operation to insert, and control moves to block 112 when one is received. Block 112 calculates the operation size by multiplying the number of records by the length of a record. It also sets Buffer Size (the size of buffers 31 and 32) to be equal to the operation size. This operation size will usually be the same size as that determined in block 102, but could change if the user sends a different number of records this time than last time. Block 113 clears buffer 32, and block 114 moves the records to be written into buffer 32. Block 115 asynchronously writes buffer 32 to segment 62 of database 60. Buffer 32 is now referred to as the "Previous Buffer". The purpose of this designation will be explained later. Block 116 sets Start Write Address = 0.

Without waiting for the above write operation on Buffer 32 to complete, block 121 checks for another operation to insert, and control moves to block 122 when one is received. Block 122 sets the Start of Insert Address equal to the address of the next segment in database 60 to insert. In our example, the Start of Insert Address will be equal to the address of the beginning of segment 63, shown in FIG. 1 as address 73.

Block 123 asks if the Start Write Address is zero. The Start Write Address keeps track of where we are in filling up the Target Buffer. The first time through the loop, we are just starting to fill up the Target Buffer so the Start Write Address is zero and control moves to block 124. Block 124 sets the Start Write Address to be equal to the Start of Insert Address, and block 125 sets the Number of Operations Since Write to be zero. Block 126 calculates the Operation Size by multiplying the number of records by the length of a record. Block 127 sets the Buffer Size to be equal to the Operation Size multiplied by the Write Trigger. The Write Trigger is initially equal to one, so the Buffer Size is initially equal to the Operation Size.

Block 128 determines the Target Buffer Address. This is done by taking the Start of Insert Address and subtracting two times the Buffer size. In our example, the Start of Insert Address is address 73, and subtracting two times the Buffer size from address 73 results in a Target Buffer Address at the beginning of segment 61, shown in FIG. 1 as address 71. Block 129 initializes TOOSMALL and TOOBIG equal to FALSE.

Block 141 checks to see if the Number of Operations Since Write is equal to zero. Block 141 will be answered affirmatively the first time through the loop, and control moves to block 142. Block 142 checks to see if the contents of the Target Buffer have been completely written to auxiliary storage. In our example, block 142 checks to see if the asynchronous write operation from buffer 31 to segment 61 of database 60 has completed. If not, buffers 31 and 32 are too small, since we are ready to fill the Target Buffer with new data but it has not completed its asynchronous write operation. This means we must synchronously wait for the write operation to complete before we can fill the Target Buffer with new data. Block 143 sets TOOSMALL=TRUE. If block 142 determines that the asynchronous write operation has complete block 143 is skipped.

Block 151 checks to see if Write Trigger=1 or the Current Buffer has been filled with data beyond a threshold percentage. Since Write Trigger=1 block 151 is answered yes, and flow of control goes to block 155. Block 155 clears the old data from the Target Buffer after the contents of the Target Buffer have been completely written to auxiliary storage. If the write operation has not completed yet, block 155 must synchronously wait for the write operation to complete before it can clear the Target Buffer.

Block 156 changes the roles of buffers 31 and 32 of FIG. 1. Before block 156 is executed the first time, buffer 31 is the Target Buffer and buffer 32 is the Previous Buffer. Now, block 156 calls buffer 31 the "Current Buffer" and buffer 32 becomes the "Target Buffer".

Block 161 checks to see if block 143 set TOOSMALL=TRUE. If so, buffers 31 and 32 need to be made larger. This is done in the preferred embodiment by incrementing Write Trigger by one, and is done in block 162. This action will increase Buffer Size in block 127 the next time through the loop, since Buffer Size is equal to Operation Size multiplied by the Write Trigger.

If block 161 is answered negatively, block 165 checks to see if block 154 set TOOBIG=TRUE. If so, buffers 31 and 32 need to be made smaller. This is done in the preferred embodiment by decrementing Write Trigger by one, and is done in block 166. This action will decrease Buffer Size in block 127 the next time through the loop, since Buffer Size is equal to Operation Size multiplied by the Write Trigger. Note that block 165 will not be answered yes the first time through the loop or when Write Trigger is one. If block 165 is answered negatively, the buffer size is just right and block 166 is skipped. Flow of control moves to block 171, where the operation (one or more records to be written) are moved into the Current Buffer. In our example, the records are moved into buffer 31. Block 172 increments the Number of Operations Since Write by one.

Block 173 checks to see if the Current Buffer is full of data. In the preferred embodiment, this is done by checking to see if the Number of Operations Since Write is greater than or equal to the Write Trigger. Block 173 would be answered yes the first time through the loop, since the Number of Operations Since Write and the Write Trigger are both one. Block 174 asynchronously writes the contents of the Current Buffer to auxiliary storage. In our example, the contents of buffer 31 are written to segment 63 of database 60. The "Current Buffer" becomes the "Previous Buffer" in block 175 after the asynchronous write of block 174 is requested. Therefore, in our example, buffer 31 is now the "Previous Buffer". Block 176 resets Start Write Address to zero. Block 181 checks to see if this was the last operation (all data has been written to database). If so, the program ends in block 182. If not, flow of control returns to block 121 of FIG. 2B. In our example, block 181 would be answered no the first time through the loop, since we have more data to insert in the database.

The second time through the loop, we want to write data to segment 64 of database 60. Block 122 sets the Start Insert Address equal to address 74 (FIG. 1). The Target Buffer Address is incremented from address 71 to address 72 (FIG. 1) in block 128. Block 142 checks to see if the Target Buffer (buffer 32) has been completely written to auxiliary storage (at segment 62). If not, the buffers are too small and block 143 sets TOOSMALL=TRUE. Block 156 changes the terminology of buffers 31 and 32 of FIG. 1. Buffer 32 becomes the Current Buffer and buffer 31 becomes the Target Buffer. Block 174 asynchronously writes the contents of the Current Buffer (buffer 32) to segment 64 of database 60. Buffer 32 then becomes the Previous Buffer in block 175.

Flow of control loops through blocks 121-181 until all of the data has been written into database 60. Buffers 31 and 32 are each called Target, Previous, and Current Buffers at various times through the loops as they leapfrog past each other writing data to segments 61-67 of database 60. Assume that after several iterations through blocks 121-181 it was determined in Block 142 that the size of buffers 31 and 32 were too small. Assume that Write Trigger (which was initialized to one) has been repetitively incremented in Block 162 and is now four. This means that the size of buffers 31 and 32 are now four times larger than they were to start. Where before it took only one operation to fill the buffer, it now takes four operations (four segments the size of segments 61-67 worth of data) to fill the buffer. Blocks 151-154 now become more meaningful, since it is now possible that the buffers are too big. Block 151 checks to see if the Current Buffer is filled beyond a threshold percentage. In the preferred embodiment, the threshold percentage is one half, although this percentage can be set to a different value. If block 151 is answered negatively, block 152 finds the Previous Buffer Address. This is done by taking the Start of Insert Address and subtracting the Buffer Size. Block 153 asks whether the contents of the Previous Buffer (either buffer 31 or 32 whichever buffer last executed an asynchronous write operation in block 174) have been completely written to the proper segment of database 60. If so, the buffers are too big since this write operation has completed too early. Ideally, the write operation of the Previous Buffer shouldn't complete until the Current Buffer is more than half full. If block 153 is answered affirmatively, the buffers are too big and block 154 sets TOOBIG=TRUE. The effect of this is that block 166 will decrement Write Trigger by one and block 127 will reduce Buffer Size the next time through the loop. Blocks 174-176 are not executed (no asynchronous write is performed) until block 173 indicates that the Current Buffer is full.

In the preferred embodiment, the value of Write Trigger is preserved within database 60 so that a past pattern of usage can be used as a first approximation for Optimal Buffer size in the future. For example, if a previous set of insert operations has set Write Trigger=4. when a new set of insert operations comes along block 127 will take this history into account the first time through the loop.

Figure 3A:
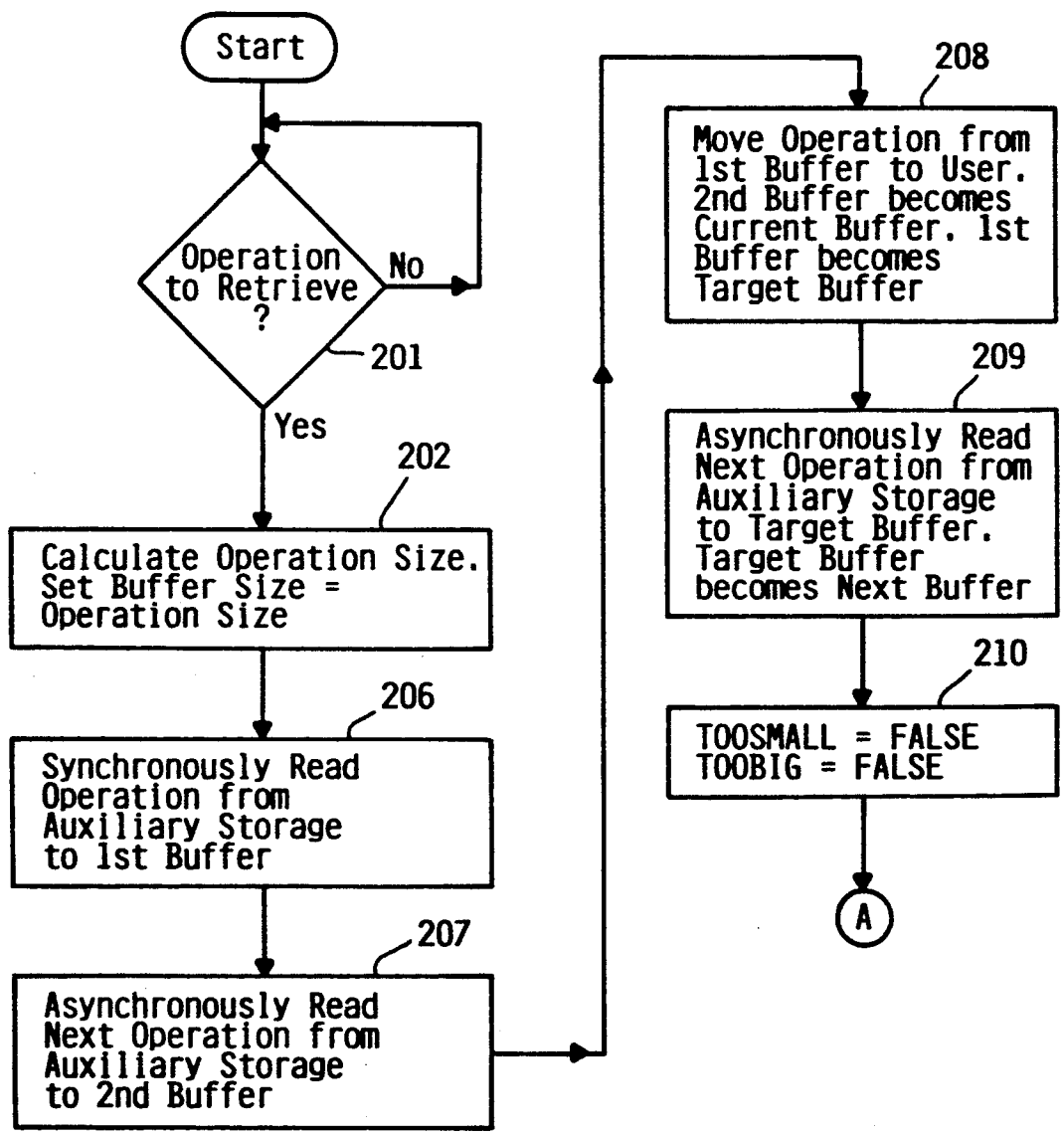
FIGS. 3A-3B shows a flowchart of the retrieve operation of invention.

The flowchart of FIGS. 3A-3D showing how processor 20 optimizes the size of buffers 31 and 32 during a database retrieve operation will now be discussed. The retrieve operation is similar to the insert operation, and much of the preceeding discussion will be applicable. For the convenience of the reader, blocks of FIG. 3 that are similiar to blocks of FIG. 2 will be given a reference numeral 100 higher than the FIG. 2 reference numeral. For example block 201 of FIG. 3A is similiar to block 101 of FIG. 2A.

Block 201 checks to see if there is an operation to retrieve. An operation is defined in the preferred embodiment as containing one or more records. Block 201 waits until there is an operation to retrieve, and control moves to block 202 when one is received. Block 202 calculates the operation size by multiplying the number of records by the length of a record. It also sets the size of buffers 31 and 32 (FIG. 1) to be equal to the operation size. Block 206 synchronously reads the operation from segment 61 of database 60 into buffer 31. Block 207 anticipates that the user will request that segment 62 will be retrieved next, so segment 62 is asynchronously read into buffer 32. Block 208 moves the operation from buffer 31 to the user via user interface 40.

Having emptied Buffer 31, buffer 32 is now referred to as the "Current Buffer". Buffer 31 is now referred to as the "Target Buffer". Block 209 anticipates the user will request segment 63 after he request segment 62, so segment 63 is asynchronously read into the Target Buffer (buffer 31). Buffer 31 is now referred to as the "Next Buffer". Block 210 initializes TOOSMALL and TOOBIG to be FALSE.

Without waiting for the above read operations to complete, block 221 checks for another operation to retrieve, and control moves to block 222 if one is received. If the user does not want another operation to be retrieved, the program ends in block 282, oblivious to the fact that the Next Buffer is still being filled via asynchronous reads from auxiliary storage 50. Since the user never explicitly requested data from Segments 62 & 63 to be retrieved, these records are not sent to the user. Block 222 sets the Start of Retrieve Address equal to the address of the next segment in database 60 to retrieve. In our example, the Start of Retrieve Address will be equal to the address of the beginning of segment 62, shown in FIG. 1 as address 72. Block 226 calculates the Operation Size by multiplying the number of records by the length of a record.

Block 241 checks to see if we are at the start of the Current Buffer (buffer 32). Block 241 will be answered affirmatively the first time through the loop, (since nothing has been moved to the user from the Current Buffer yet) and control moves to block 242. Block 242 checks to see if the contents of the Current Buffer have been completely read from auxiliary storage. In our example, block 242 checks to see if the asynchronous read operation from segment 62 to buffer 32 of database 60 which we initiated in block 207 has completed. If not, buffers 31 and 32 are too small, since we are ready to move data from the Current Buffer to the user but it has not completed its asynchronous read operation. This means we must synchronously wait for the read operation to complete before we can move data from the Current Buffer to the user. Block 243 sets TOOSMALL=TRUE. If block 242 determines that the asynchronous read operation has completed, block 243 is skipped.

Block 251 checks to see if the Read Trigger=1 or the Current buffer has been emptied below a threshold percentage. The Read Trigger is initialized to 1 and has not been changed at this point in the flow diagram, so block 251 is answered affirmatively and flow of control moves to block 257. Blocks 253-254 will be discussed in more detail later. Block 257 moves an operation from the Current Buffer to the user. If Read Trigger=1, there is only one operation in the Current Buffer, so block 257 would move the entire contents of the Current Buffer to the user. However, if Read Trigger is larger than one, as will be explained later, more than one operation is in the Current Buffer. Only one operation at a time is moved to the user. Block 258 checks to see if there are any more operations in the Current Buffer. If so, control loops back to block 221 of FIG. 3B. If not, block 256 changes the terminology of buffers 31 and 32 of FIG. 1. Before block 256 is executed the first time, buffer 31 is the Next Buffer and buffer 32 is the Current Buffer. Now, block 256 calls buffer 31 the "Current Buffer" and buffer 32 becomes the "Target Buffer".

Block 261 checks to see if block 243 set TOOSMALL=TRUE. If so, buffers 31 and 32 need to be made larger on the subsequent Read requests. This is done in the preferred embodiment by incrementing Read Trigger by one, and is done in block 262. This action will increase the Buffer Size of the Target Buffer in block 277, since Buffer Size is equal to Operation Size multiplied by the Read Trigger. Block 262 also resets TOOSMALL =FALSE.

If block 261 is answered negatively, block 265 checks to see if block 254 set TOOBIG=TRUE. If so, buffers 31 and 32 need to be made smaller on the subsequent Read requests. This is done in the preferred embodiment by decrementing Read Trigger by one, and is done in block 266. This action will decrease Buffer Size in block 277, since Buffer Size is equal to Operation Size multiplied by the Read Trigger. Note that block 265 will not be answered yes the first time through the loop or when Read Trigger is one. If block 265 is answered negatively, the buffer size is just right and block 266 is skipped. Flow of control moves to block 277, where the Buffer Size is calculated, as has been discussed.

Block 278 asynchronously reads the next operation or operations from auxiliary storage 50 into the Target Buffer. If Read Trigger=1, as is the case in our example, one operation (segment 64) will be read into the Target Buffer (buffer 32). If Read Trigger had been incremented, thereby increasing the size of buffers 31 and 32, the number of operations needed to fill the Target Buffer would be asynchronously read from auxiliary storage 50. For example, if Read Trigger was 4, 4 operations (which equates to 4 segments in our example) would be read into the Target Buffer. Flow of control returns to block 221 of FIG. 3B.

Figure 3B:
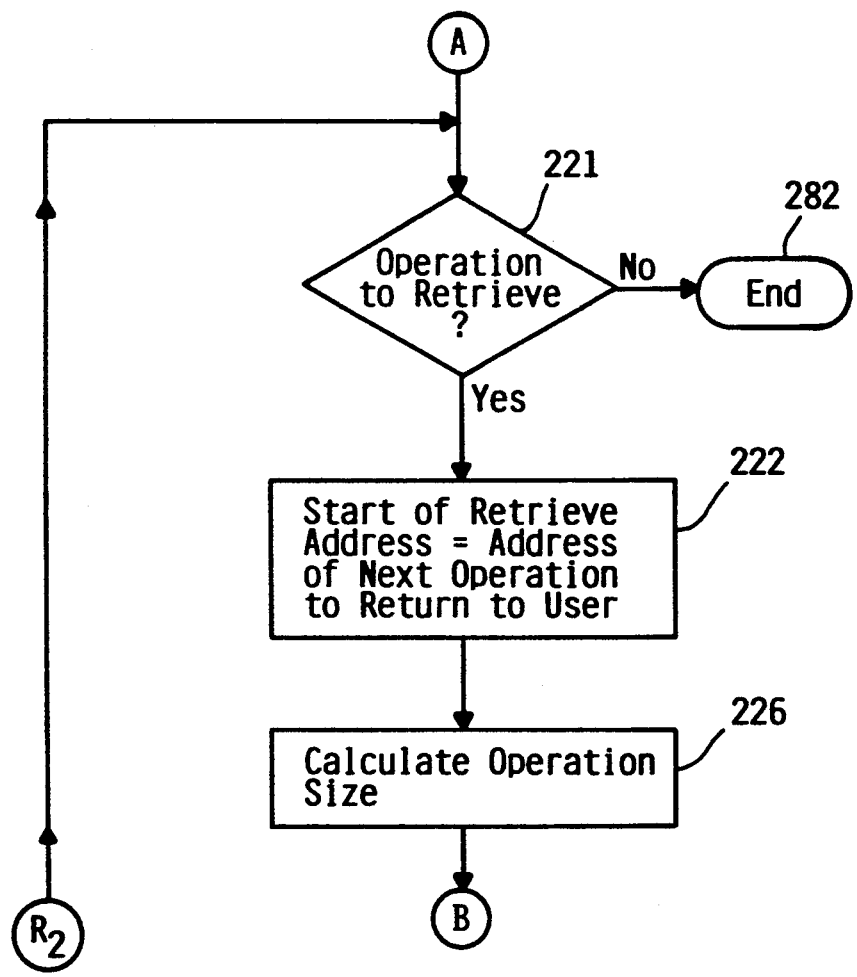
Figure 3C:
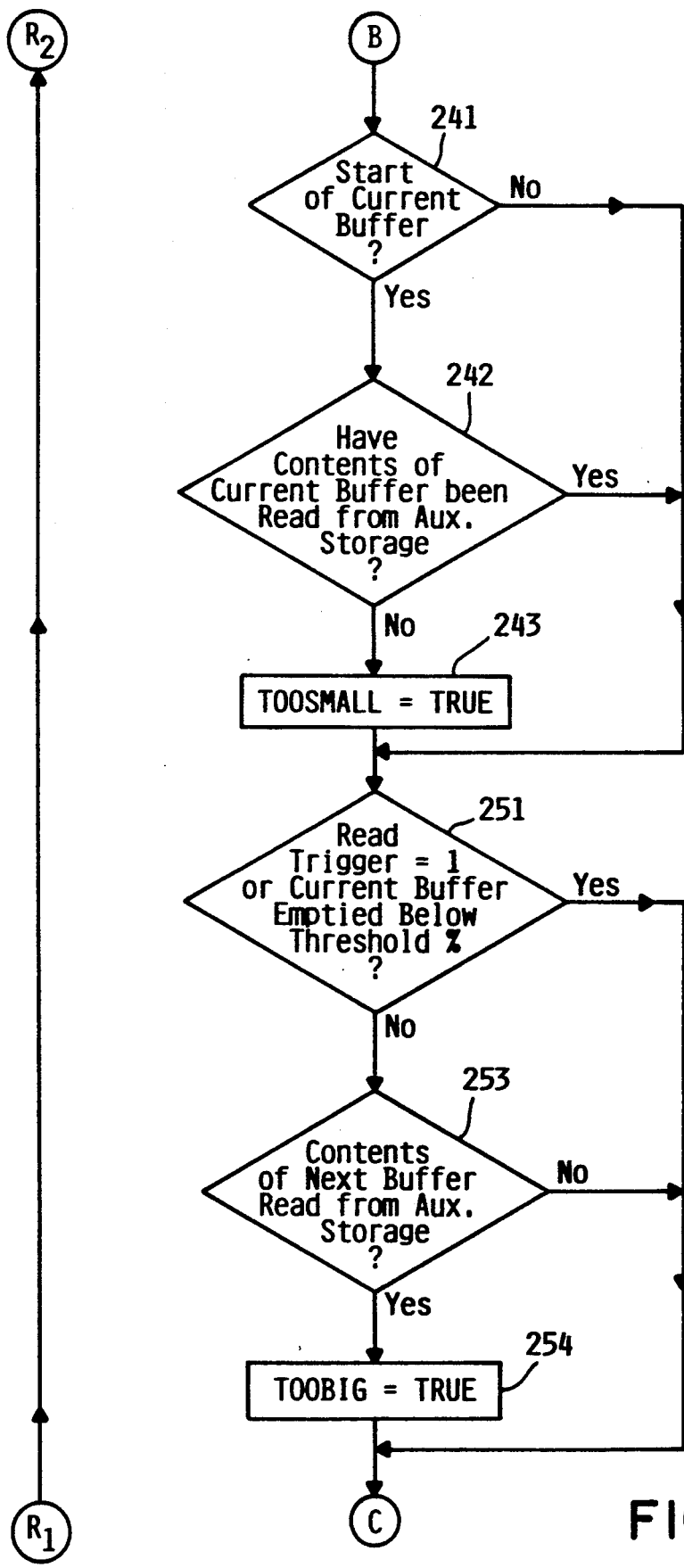
Figure 3D:
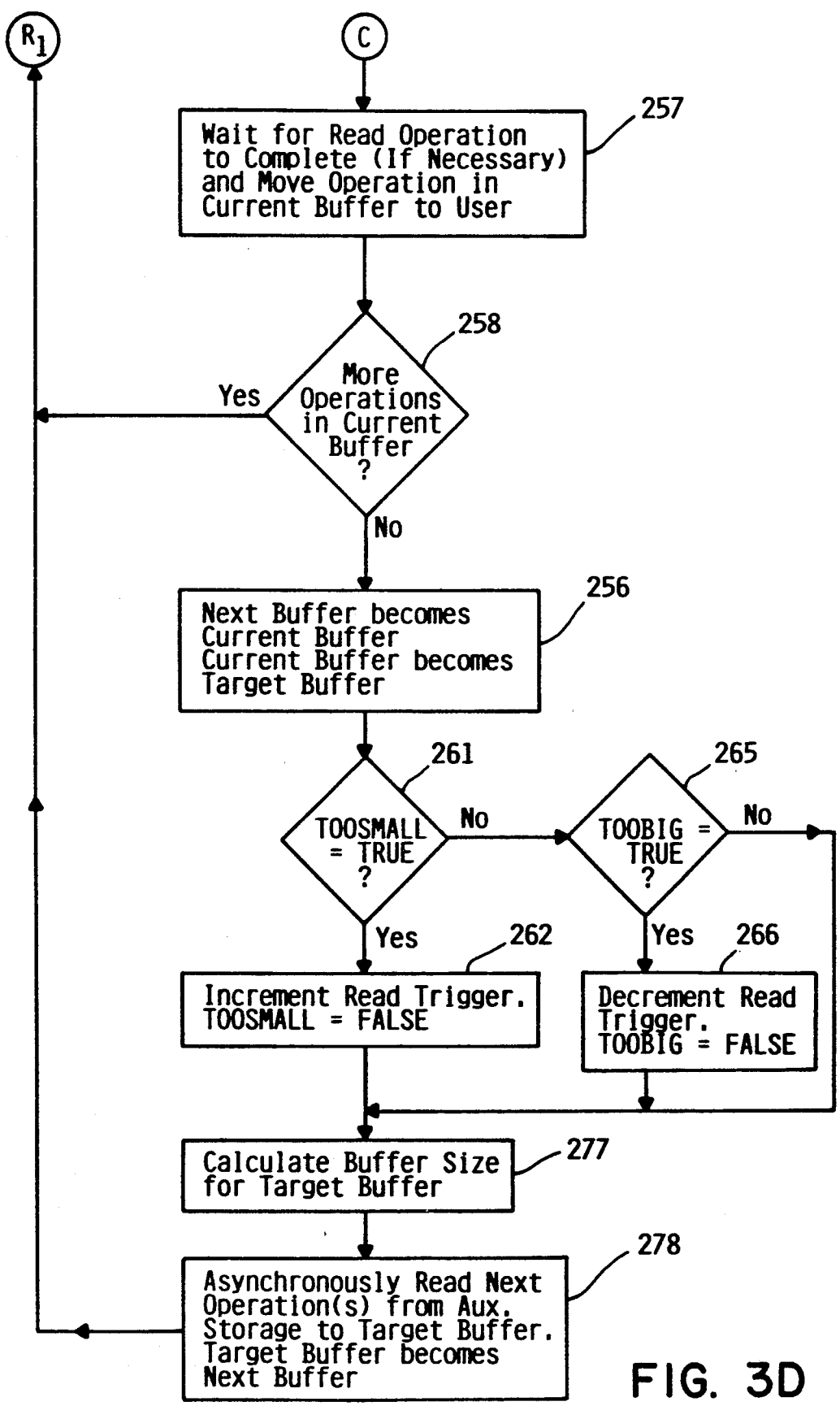

Flow of control loops through FIGS. 3B-3D until all of the requested data has been retrieved from database 60 and sent to the user. Buffers 31 and 32 are each called Target, Next, and Current Buffers at various times through the loops as they leapfrog past each other reading data from segments 61-67 of database 60. Assume that after several iterations it was determined in block 242 that the size of buffers 31 and 32 were too small. Assume that Read Trigger (which was initialized to one) is now four. This means that the size of buffers 31 and 32 are now four times larger than they were to start. Where before it took only one operation to fill the buffer, it now takes four operations to fill the buffer. Blocks 251-254 now become more meaningful, since it is now possible that the buffers have become too big. Block 251 checks to see if the Current Buffer has been emptied (operations sent to user) below a threshold percentage. In the preferred embodiment, the threshold percentage is one half, although this percentage can be set to a different value. If block 251 is answered negatively, Block 253 asks whether the contents of the Next Buffer (either buffer 31 or 32, whichever buffer last executed an asynchronous read operation in block 278) have been completely read from database 60. If so, the buffers are too big, since this read operation has completed too early. Ideally, the read operation of the Next Buffer shouldn't complete until the Current Buffer has been emptied to less than half full. If block 253 is answered affirmatively, the buffers are too big and block 254 sets TOOBIG=TRUE. The effect of this is that block 266 will decrement Read Trigger by one and block 277 will reduce Buffer Size accordingly.

While this invention has been described with respect to the preferred embodiment, it will be understood by those skilled in the art that various changes in detail may be made therein without departing from the spirit, scope and teaching of the invention. For example, this invention could be used for applications other than database applications. Accordingly, the herein disclosed is to be limited only as specified in the following claims.

What is claimed is:

1. A method of optimizing the size of first and second I/O buffers of a computer system, said first and said second I/O buffers residing in main storage, said method comprising the steps of:

determining whether said computer system has completed its data operation on said second buffer before said computer system has completed its data operation on said first buffer, said determining step being performed by said computer system;

increasing the size of said first and second buffers if said computer system has completed its data operation on said second buffer before said computer system has completed its data operation on said first buffer, said increasing step being performed by said computer system;

determining whether said computer system has completed its data operation on said first buffer before a threshold percentage has been triggered by the amount of data in said second buffer, said determining step being performed by said computer system; and decreasing the size of said first and second buffers if said computer system has completed its data operation on said first buffer before said threshold percentage has been triggered, said determining step being performed by said computer system.

2. A method of optimizing the size of first and second I/O buffers of a computer system when inserting data into a database, said first and said second I/O buffers residing in main storage, said method comprising the steps of:

determining if said second buffer is full before said computer system has completely written the contents of said first buffer to said database, said determining step being performed by said computer system;

increasing the size of said first and second buffers if said second buffer is full before said computer system has completely written the contents of said first buffer to said database, said increasing step being performed by said computer system;

determining if said computer system has completely written the contents of said first buffer to said data base before said computer system has filled said second buffer beyond a threshold percentage, said determining step being performed by said computer system; and decreasing the size of said first and second buffers if said computer system has completely written the contents of said first buffer to said data base before said computer system has filled said second buffer beyond said threshold percentage, said decreasing step being performed by said computer system.

3. A method of optimizing the size of first and second I/O buffers of a computer system when retrieving data from a database, said first and second buffer residing in main storage, said method comprising the steps of:

determining if said computer system has emptied said first buffer before said computer system has completely read the contents of said second buffer from said database, said determining step being performed by said computer system;

increasing the size of said first and second buffers if said computer system has emptied said first buffer before said computer system has completely read the contents of said second buffer from said database, said increasing step being performed by said computer system;

determining if said computer system has completely read the contents of said second buffer from said database before said computer system has emptied said first buffer below a threshold value, said decreasing step being performed by said computer system; and decreasing the size of said first and second buffers if said computer system has completely read the contents of said second buffer from said database before said computer system has emptied said first buffer below said threshold value, said determining step being performed by computer system.

4. A computer system having optimized first and second I/O buffers for inserting data into a database, comprising:

a main storage having said first and second buffers;

an auxiliary storage having said database;

means connected to said main storage for determining whether said second buffer is full before the contents of said first buffer are completely written to said database;

means connected to said main storage for increasing the size of said first and second buffers if said second buffer is full before the contents of said first buffer are completely written to said database;

means connected to said main storage for determining if the contents of said first buffer have been completely written to said database before said second buffer is filled beyond a threshold value; and means connected to said main storage for decreasing the size of said first and second buffers if the contents of said first buffer have been completely written to said database before said second buffer is filled beyond said threshold value.

5. A computer system having optimized first and second I/O buffers for retrieving data from a database, comprising:

a main storage having said first and second buffers;

an auxiliary storage having said database;

means connected to said main storage for determining whether said first buffer is emptied before the contents of said second buffer have been completely read from said database;

means connected to said main storage for increasing the size of said first and second buffers if said first buffer is emptied before the contents of said second buffer have been completely read from said database;

means connected to said main storage for determining if the contents of said second buffer are completely read from said database before said first buffer is emptied below a threshold value; and means connected to said main storage for decreasing the size of said first and second buffers if the contents of said second buffer are completely read from said database before said first buffer is emptied below said threshold value.

6. A computer system having optimized first and second I/O buffers, comprising:

a main storage having said first and second buffers;

an auxiliary storage;

means connected to said main storage for determining if said second buffer is fully processed before the contents of said first buffer have been completely written to said auxiliary storage;

means connected to said main storage for increasing the size of said first and second buffers if said second buffer is fully processed before the contents of said first buffer have been completely written to said auxiliary storage; and means connected to said main storage for determining if the contents of said first buffer have been completely written to said auxiliary storage before said second buffer triggers a threshold percentage; and means connected to said main storage for decreasing the size of said first and second buffers if the contents of said first buffer have been completely written to said auxiliary storage before said second buffer triggers said threshold percentage.

7. A computer system having optimized first and second I/O buffers, comprising:

a main storage having said first and second buffers;

an auxiliary storage;

means for determining if said first buffer is emptied before the contents of said second buffer have been completely read from said auxiliary storage;

means for increasing the size of said first and second buffers if said first buffer is emptied before the contents of said second buffer have been completely read from said auxiliary storage;

means connected to said main storage for determining if the contents of said second buffer have been completely read from said auxiliary storage before said first buffer is emptied below a threshold value; and means connected to said main storage for decreasing the size of said first and second buffers if the contents of said second buffer have been completely read from said auxiliary storage before said first buffer is emptied below said threshold value.

* * * * *